United States Patent [19]
Katsuki

[11] Patent Number: 5,162,837
[45] Date of Patent: Nov. 10, 1992

[54] ELECTRONIC CAMERA HAVING A BUILT-IN STROBE

[75] Inventor: Shinji Katsuki, Tokyo, Japan
[73] Assignee: Sony Corporation, Tokyo, Japan
[21] Appl. No.: 686,379
[22] Filed: Apr. 17, 1991

[30] Foreign Application Priority Data

Apr. 28, 1990 [JP] Japan .................................. 2-113264

[51] Int. Cl.⁵ ............................................ G03B 15/05
[52] U.S. Cl. .................................... 354/416; 354/423
[58] Field of Search ........ 354/413, 416, 417, 420–423, 354/195.1, 195.11, 149.11

[56] References Cited

U.S. PATENT DOCUMENTS 4,491,404 1/1985 Hasegawa et al. ................... 354/416
4,924,248 5/1990 Taniguchi et al. ............... 354/195.1

Primary Examiner—W. B. Perkey
Attorney, Agent, or Firm—Ronald P. Kananen

[57] ABSTRACT

An electronic camera having a built-in strobe, in which upon a normal photographing mode a return light of a light emitted from the strobe on an object to be photographed is detected to thereby control a light emission amount of the strobe and a controller is provided for controlling the light emission amount of the strobe and an opening degree of an iris to be fixed to constant values, respectively, upon a macroscopic photographing mode where a distance between the camera and the object is shorter than that upon the normal photographing mode.

8 Claims, 1 Drawing Sheet

ELECTRONIC CAMERA HAVING A BUILT-IN STROBE

BACKGROUND OF THE INVENTION

1. Field of the Invention

The present invention relates to electronic cameras and, more particularly, to an electronic camera having a built-in strobe suitable for use in an electronic still camera or the like.

2. Description of the Prior Art

Various types of recording apparatus, have previously been developed in the art, including so-called electronic still cameras, each for recording a still picture in the form of an electric image signal on a magnetic disk. In order to perform the photographing operation by using the electronic still camera, its exposure condition is required to be controlled in the same manner as a general still camera using a metal halide film. As the exposure control methods when photographing an object by using a strobe in the night and so forth there are two approaches, one being to control the exposure by controlling an amount of emission light of the strobe and the other being to control the exposure by controlling an opening degree of an iris and a shutter speed while making an amount of the light emission of the strobe constant.

The former method of controlling the exposure by controlling an amount of the light emission of the strobe is called an auto-strobe control method, wherein the amount of the light emission of the strobe is controlled by detecting incident radiation or an amount of light which is reflected from an object to which light is emitted from the strobe. This auto-strobe control method can be realized with relatively simplified constructions and so the method has been applied broadly to various types of cameras with strobes.

The latter method of controlling the exposure by controlling an opening degree of an iris and a shutter speed while making an amount of the light emission of the strobe constant is called a "flashmatic method", wherein the opening degree of an iris and a shutter speed are controlled in accordance with a distance between the camera and an object. Thus, this method requires an accurate control of the opening degree of an iris and a shutter speed in accordance with information of the distance in order to suitably control the exposure, so that this method has not been used generally. In particular, in an electronic still camera, an exposure latitude capable of performing proper photographing is narrower when compared with that of a still camera using a silver film and so it is required to control the exposure value more strictly when compared with a still camera using a silver film. Thus, it has been difficult to apply the flashmatic method to an electronic still camera and so the auto-strobe method has been applied thereto generally.

Now, there is known a type of camera that is capable of photographing an object positioned in a range of distance shorter than the normal range of distance which can be focused by rotating a normal focus ring, that is, a camera capable of performing macroscopic photographing. In this type of camera, the distance between the camera and an object capable of performing the macroscopic photographing is around 50 cm, for example. When performing the macroscopic photographing by using this type of camera, a field angle of a photographing lens or the photographing lenses sometimes does not coincide with an incident angle of a photo receptor element which detects an amount of light reflected from an object to which a light beam is emitted from a strobe due to the distance between the camera and an object. In this case, the auto-strobe control can not be performed satisfactorily, so that the exposure may not performed suitably.

This phenomenon will be explained with reference to FIG. 2 illustrating major portions of a typical example of conventional electronic still cameras. In FIG. 2, an object image is focused on an image plane of a solid state image-pickup element 2 such as a charge-coupled device (CCD) through a photographing lens 1, or a plurality of lenses. The solid state image-pickup element 2 converts the focused image into an electric image signal and applies it to an image signal processing circuit 3 which in turn converts the image signal into a predetermined video signal. The video signal is applied to a recording portion (not shown) through an output terminal 4. In this case, an aperture is determined by controlling an opening degree of an iris 5 disposed in the vicinity of the photographing lens 1 and a shutter speed is determined in accordance with a time period during which the light is received on the image plane of the solid state image-pickup element 2.

A strobe or a stroboscopic lamp 6 is mounted on the camera at a position apart from the photographing lens 1. The light emission of the strobe 6 is controlled by a light emission control circuit 7 in an interlocked relation with the photographing operation. Further, a photo receptor element 8 used in the auto-strobe control for detecting an amount of light reflected from an object to which a light is emitted from the strobe 6 is mounted in the vicinity of the photographing lens 1. The photo receptor element 8 delivers information representing the detected amount of the reflected light from an object to the light emission control circuit 7 when the strobe 6 emits light. The light emission control circuit 7 then controls suitably an amount of emitted light, i.e. a time period during which the strobe 6 emits light, in accordance with the information of the detected amount of the reflected light to thereby perform the auto-strobe operation.

In a normal photographing operation for photographing an object in a normal range where the distance between the photographing lens 1 and an object m1 is more than 80 cm, for example, the field angle of the photographing lens 1 coincides with the incident angle of the photo receptor element 8, while in the macroscopic photographing operation where the distance between the photographing lens 1 and an object m2 is about 50 cm, for example, the incident angle of the photo receptor element 8 can not cover all of the field angle of the photographing lens 1 due to a difference of mounted position between the photographing lens 1 and the photo receptor element 8. Thus, in the macroscopic photographing mode, the return light from the object m2 can not be detected satisfactorily on the basis of the light incident on the photo receptor element 8 so that the auto-strobe operation can not be performed satisfactorily and hence the exposure can not be performed suitably.

In order to overcome this drawback in the macroscopic photographing mode, it is proposed to control the exposure by the flashmatic method. However as described above, use of the flashmatic method requires an accurate measurement of the distance between the camera and an object and so forth in order to suitably control the exposure, resulting in complex constructions of the camera.

OBJECTS AND SUMMARY OF THE INVENTION

Accordingly, it is a general object of the present invention to provide an improved electronic camera in which the aforementioned shortcomings and disadvantages of the prior art can be eliminated.

More specifically, it is an object of the present invention to provide an improved electronic camera which is capable of performing the macroscopic photographing using a strobe built therein satisfactorily with simplified constructions thereof.

According to an aspect of the present invention, an electronic camera having a built-in strobe is provided, in which, when in a normal photographing mode, a return light of a light emitted from the strobe is detected to thereby control a light emission amount of the strobe. This electronic camera is composed of a device for controlling the light emission amount of the strobe and an opening degree of an iris to be fixed to constant values respectively, when in a macroscopic photographing mode where a distance between the camera and an object is shorter than that of the normal photographing mode.

The above and other objects, features, and advantages of the present invention will become apparent from the following detailed description of an illustrative embodiment thereof to be read in conjunction with the accompanying drawing.

DETAILED DESCRIPTION OF THE PREFERRED EMBODIMENT

Preferred embodiment of the present invention will now be described by way of example and with reference to the accompanying drawing.

Figure 1:
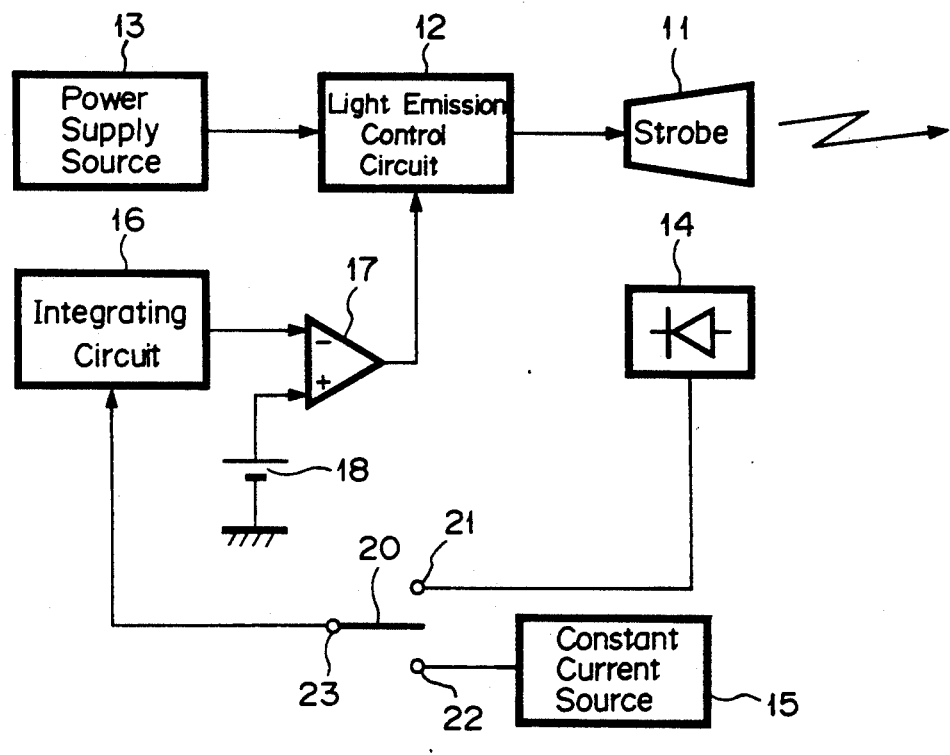
FIG. 1 is a block diagram illustrating main portions of an embodiment of an electronic camera according to the present invention.
Figure 2:
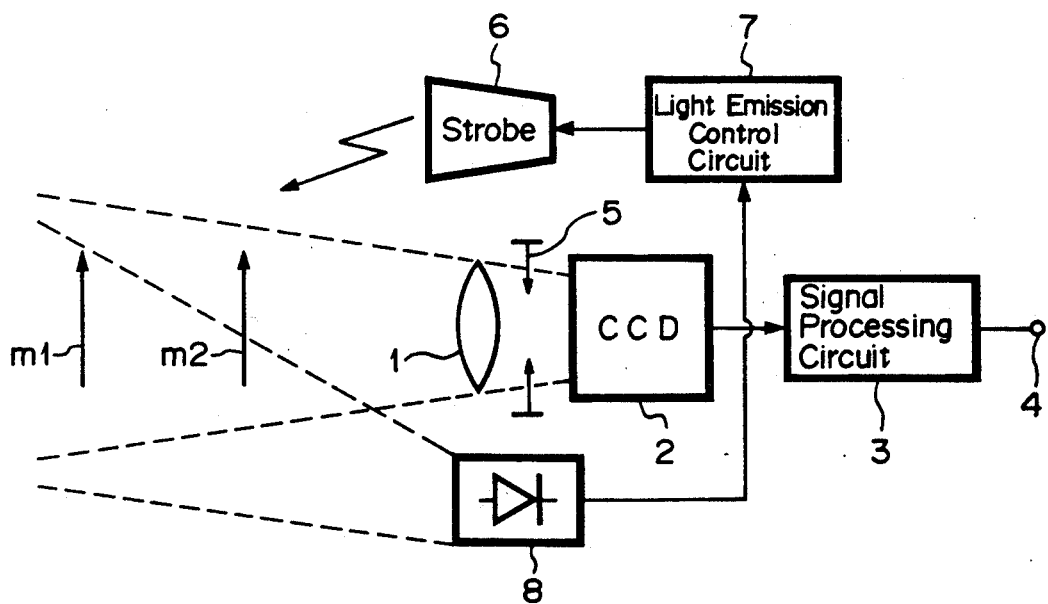
FIG. 2 is a block diagram illustrating a conventional electronic camera and explaining a photographing operation thereof.

FIG. 1 is a block diagram illustrating a strobe and a control unit thereof of an electronic camera according to the present invention. Other constructions of the camera of the embodiment are the same as the conventional ones and so the constructions thereof are omitted in FIG. 1 and in the following descriptions.

In FIG. 1, an amount of emitted light, i.e. a time period of light emission from a strobe or a stroboscopic lamp 11 is controlled by a light emission control circuit 12. The electronic camera is so constructed that the strobe 11 is supplied with power from a power supply source or circuit 13 to thereby emit light under a pre-given condition in an interlocking relation with a photographing operation when a shutter button or switch (not shown) provided on a body of the camera is pushed down.

A photo receptor element 14, which is used in an auto-strobe control mode, detects light reflected from an object to which the light is emitted from the strobe 11 and generates a current signal representing an amount of the detected light which is a function of an incident radiation as information of an amount of received (detected) light to apply the current signal to a first stationary contact 21 of a change-over switch 20. A constant current source 15 supplies a current signal with a constant current value to a second stationary contact 22 of the change-over switch 20. The constant current source 15 starts supplying the current signal at the moment when the strobe 11 emits the light. The change-over switch 20 applies one of the current signals applied to a moving contact 23 thereof to an integration circuit 16. The change-over operation of the change-over switch 20 is interlocked with the change-over operation of the photographing mode of the camera to which the strobe control unit of FIG. 1 is mounted. Namely, the moving contact 23 is connected to the first stationary contact 21 in a normal photographing mode for photographing an object which is away from the camera by a distance more than 80 cm, for example, to thereby apply the current signal from the photo receptor element 14 to the integration circuit 16, while the moving contact 23 is connected to the second stationary contact 22 in a macroscopic photographing mode for photographing an object which is away from the camera by a distance less than 80 cm, for example, to thereby apply the current signal from the constant current source 15 to the integration circuit 16.

The integration circuit 16 integrates the current signal applied thereto to thereby obtain an integrated voltage value, thereby applying the integrated voltage value to an inverted input terminal of a comparator 17. A non-inverted input of the comparator 17 is applied with a constant voltage from a constant voltage source 18. The comparator 17 therefore compares the integrated voltage value with the constant voltage value and delivers a result of the comparison to the light emission control circuit 12.

Now, in this embodiment, if the macroscopic photographing mode is selected by connecting the moving contact 23 of the change-over switch 20 to its second stationary contact 22, the opening degree of an iris (not shown) located at a position to face a photographing lens or photographing lenses (not shown) fixed at a constant value.

Next, the explanation will be made of the operations of the electronic camera having the built-in strobe of this embodiment when photographing an object. In the normal photographing mode where the distance between the camera and the object is more than 80 cm, the moving contact 23 of the change-over switch 20 is connected to the first stationary contact 21, thereby performing an auto-strobe control as described below. In this state, if the photographing operation is performed by using the strobe 11, the photo receptor element 14 detects the reflected light from an object to thereby apply the current signal representing the information of an amount of the received light to the integration circuit 16 through the switch 20. The light emission control circuit 12 controls the light emission of the strobe 11 in response to the output of the comparator 17 in a manner that the light emission of the strobe 11 is continued by applying the power from the power supply circuit 13 to the strobe 11 until the output voltage of the integration circuit 16 representing the integrated value of the received light exceeds the constant voltage value from the constant voltage source 18. If the output voltage of the integration circuit 16 exceeds the constant voltage value from the constant voltage source 18, the light emission control circuit 12 stops the application of the power from the power supply circuit 13 to the strobe 11 to thereby stop the light emission of the strobe 11.

On the other hand, in a macroscopic photographing mode where the distance between the camera and an object is less than 80 cm, the moving contact 23 of the switch 20 is connected to the second stationary contact 22, so that the application of the current signal from the photo receptor element 14 to the integration circuit 16 is terminated, thereby terminating the auto-strobe control mode. The integration circuit 16 therefore receives the current signal of the constant current value from the constant current source 15 instead of the information of an amount of received light from the photo receptor element 14. Thus, the integrated value of the integration circuit 16 increases at a constant rate with the lapse of time in proportion to the luminance time period of the strobe 11 and, when a predetermined time period lapses after the initiation of the light emission from the strobe 11, the integrated value exceeds the constant voltage value from the constant voltage source 18, so that the light emission of the strobe 11 is terminated.

Thus, in the macroscopic photographing mode, the light emission period of the strobe 11 is controlled to the predetermined time period. Further, in the macroscopic photographing mode, the opening degree of the iris is fixed to the constant value, so that the photographing operation using the strobe in the macroscopic photographing mode can be performed under a predetermined exposure condition.

Accordingly, the macroscopic photographing can be performed under the predetermined exposure condition.

Now, since in the macroscopic photographing mode, the distance between the camera and an object is less than 80 cm, the point-blank range less than 80 cm can be assumed. Therefore, if exposure conditions such as the light emission time period of the strobe and the opening degree of the iris suitable for the macroscopic photographing in the point-blank range less than 80 cm are set, the photographing operation can be made satisfactorily.

Thus, according to the electronic camera having the built-in strobe of this embodiment, the photographing operation in the normal photographing mode can be performed satisfactorily by the auto-strobe control and also the photographing operation in the macroscopic photographing mode can be performed satisfactorily under the predetermined exposure conditions, so that the photographing operation can be performed satisfactorily under suitable exposure states over all ranges of the distance between the camera and an object. Further, since the macroscopic photographing can be performed without requiring the measurement of the distance between the camera and an object, the constructions of the electronic camera can be simplified.

Now, the explanation has been made about a case where the present invention is applied to an electronic still camera but the present invention may also be applied to a normal still camera using a silver film.

Accordingly, the present invention can perform even the macroscopic photographing satisfactorily by using the strobe with the simplified constructions.

Having described a preferred embodiment of the invention with reference to the accompanying drawing, it is to be understood that the invention is not limited to the precise embodiment and that various changes and modifications could be effected by one skilled in the art without departing from the spirit or scope of the novel concepts of the invention as defined in the appended claims.

I claim as my invention:

1. An electronic camera having a built-in strobe, in which when in a normal photographing mode, a return light of a light emitted from said strobe is detected to thereby control a light emission amount of said strobe, comprising:
   control means for controlling the light emission amount of said strobe and an opening degree of an iris to be fixed to constant values respectively when in a macroscopic photographing mode where a distance between the camera and an object is shorter than that when in the normal photographing mode, wherein said control means includes:
   constant current generating means for generating a constant current,
   an integration circuit for integrating the constant current supplied from said constant current generating means when the macroscopic photographing is selected, and
   means for terminating the light emission of the strobe when an integrated value of said integration circuit reaches a pregiven value.

2. An electronic camera according to claim 1 wherein said controlling means includes time counter means for counting a time lapse after emitting light from the strobe and means for terminating the light emission of the strobe when a time lapse counted by said time counter means reaches a given time period.

3. An electronic camera having a built-in strobe comprising:
   means for selecting one of a normal photographing mode for photographing an object positioned in a normal distance from the camera and a macroscopic photographing mode for photographing an object positioned in a distance shorter than the normal distance;
   reflected light detecting means for detecting an amount of light reflected from said object to which light is emitted from the strobe when in the normal photographing and for generating a current signal corresponding to the amount of the detected light;
   constant current generating means for generating a constant current,
   integration circuit means for integrating the current signal supplied from said reflected light detecting means when in the normal photographing mode and for integrating the constant current supplied from said constant current generating means when in the macroscopic photographing mode, and
   means for terminating the light emission of the strobe when an integrated value of said integration circuit reaches a pregiven value.

4. An electronic camera as claimed in claim 3, wherein said selecting means is switched in a ganged relation to switching between said photographing modes of said electronic camera.

5. An electronic camera as claimed in claim 3, wherein an opening degree of an iris is fixed to a predetermined value when the macroscopic photographic mode is selected.

6. An electronic camera, comprising:
   a built in strobe;
   a light emission control circuit means for controlling the light emission of said strobe;
   means for selecting either a normal photographing mode for photographing an object positioned at a normal distance from the camera and a macroscopic photographing mode for photographing an object positioned at a distance shorter than the normal distance;

reflected light detecting means for detecting an amount of light reflected from said object to which light is emitted from the strobe when in the normal photographing mode and for generating a reflected light output signal representative thereof;

a constant current generating means for generating a constant current signal;

means for processing said constant current signal or said reflected light output signal relative to a reference signal to provide an processed output signal for controlling said light emission control circuit, said processing means processing said constant current signal when in the macroscopic photographing mode, and processing said reflected light output signal when in said normal photographing mode, said light emission control circuit terminating light emission from the strobe when said processed signal reaches a predetermined value determined by said reference signal.

7. An electric camera as set forth in claim 6 wherein said processing means includes switching means for switching between said photographing modes of said camera.

8. An electronic camera as set forth in claim 6, wherein an opening degree of an iris is fixed to a predetermined value when the macroscopic photographic mode is selected.

* * * * *